UNITED STATES PATENT OFFICE.

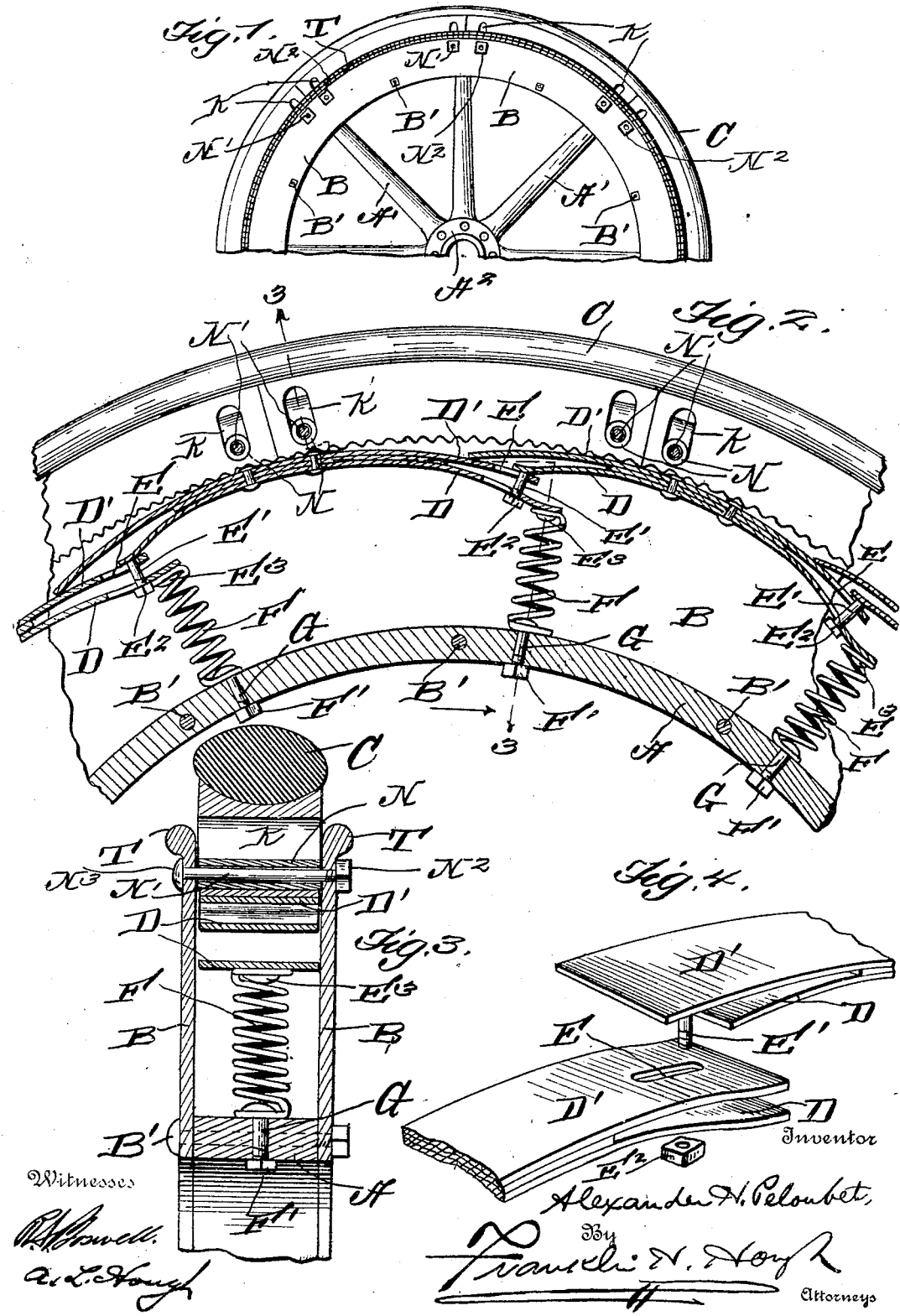

ALEXANDER H. PELOUBET, OF NEWARK, NEW JERSEY.

RESILIENT WHEEL.

962,975.

Specification of Letters Patent. Patented June 28, 1910.

Application filed April 6, 1910. Serial No. 553,773.

*To all whom it may concern:*

Be it known that I, ALEXANDER H. PELOUBET, a citizen of the United States, residing at Newark, in the county of Essex and State of New Jersey, have invented certain new and useful Improvements in Resilient Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in resilient wheels for vehicles, the object in view being to dispense with the pneumatic tire commonly employed and substitute therefor a means which will take up vibration and obviate the use of pneumatic tires and expense incident to the use thereof.

My invention comprises various details of construction and combinations and arrangements of parts which will be hereinafter fully described and then specifically defined in the appended claims.

I illustrate my invention in the accompanying drawings, in which:—

Figure 1 is a side elevation of a portion of a wheel made in accordance with my invention. Fig. 2 is an enlarged sectional view longitudinally through the wheel. Fig. 3 is a cross sectional view on line 3—3 of Fig. 2, and Fig. 4 is a detail perspective view of the meeting ends of leaf springs forming a part of the device.

Reference now being had to the details of the drawings by letter, A designates a felly of wood or metal and with a flat tire surface and to which spokes A' are fastened which radiate from the hub $A^2$.

B, B designate circular outlined rings or bands which are held to said felly by means of bolts B' passing through registering apertures in the felly and plates, said plates adapted to form guide means for the yielding tire C, preferably of rubber, in one piece or in sections as may be desired. Fastened to each other in pairs at different locations are the leaf springs D and D', the outer of said leaf springs being provided each with an elongated slot E and the inner of said springs having lugs E' integral therewith, the ends of said springs which are arranged in pairs being adapted to overlap one another, as shown in Fig. 2 of the drawings, and the lugs upon said springs adapted to have sliding movements in the slots E as shown. In order to hold said springs interlocked, nuts $E^2$ are mounted upon the threaded ends of the lugs as shown. Each of the inner of said leaf springs is provided with a lug $E^3$ near each end and each lug $E^3$ is adapted to receive one end of a coiled spring F, the other end being held by means of a bolt G to the felly A by means of nuts F'. Said leaf springs may be of any length, extending especially about the circumference of the felly, and co-act with the coiled springs to form resilient means for taking up vibration. Said rings or bands are provided with elongated slots K at intervals and tubular shells N pass through said slots in which they are guided. Bolts N' pass through said tubular shells and have nuts $N^2$ mounted upon their threaded ends, while the heads $N^3$ of said bolts bear against the marginal edges of one of the bands or rings and serve to coöperate with the nuts and bolts passing through the felly to hold the plates in parallel relation and spaced apart.

When the parts of the wheel are assembled as shown in Fig. 2 of the drawings, it will be noted that the rubber is allowed to yield under pressure, the limit of its yielding movement being determined by the length of the slots in which the tubular shells have a play. In the event of the outer portion of the tire yielding between the bands B a sufficient distance, marginal edges of said bands or plates, which are preferably thickened as shown by letter T, will serve as means for preventing the wheel from skidding or slipping sidewise. By the combination of the springs mounted as shown and described, vibratory movements will be absorbed and a wheel produced which will have practically the same effect upon the vehicle to which it is mounted as would the ordinary pneumatic tires and at the same time avoid the inconveniences of the pneumatic tire incident to punctures, etc., and greatly reduce the expense of automobile and other vehicle wheels.

What I claim to be new is:—

1. A resilient wheel comprising a felly, circular outlined plates fastened thereto and spaced apart, a cushion tire movable between said plates, means for fastening the tire to the latter and allowing the tire to yield and be guided by the plates, leaf springs arranged in pairs and fastened together, the ends of the pairs of springs overlapping one another, said springs provided with registering slots, a lug adjacent to corresponding ends of one leaf spring of each pair and adapted to be guided in said registering slots, and coiled springs interposed between said leaf springs and felly.

2. A resilient wheel comprising a felly, circular outlined plates fastened thereto and spaced apart, a cushion tire movable between said plates and provided with slots, open-ended tubular shells positioned one in each of said slots, bolts mounted in registering apertures in said plates and passing through said shells, leaf springs arranged in pairs and fastened together, the ends of the springs overlapping one another and provided with registering slots, a lug fastened to the corresponding ends of one leaf spring of each pair and adapted to be guided in said registering slots, and coiled springs interposed between said leaf springs and the felly.

In testimony whereof I hereunto affix my signature in the presence of two witnesses.

ALEXANDER H. PELOUBET.

Witnesses:
WM. D. DALRYMPLE,
JAMES CRUSO.